Patented Jan. 26, 1954

2,667,458

UNITED STATES PATENT OFFICE 2,667,458

TEXTILE TREATING MATERIALS

Dennis Arthur William Adams and Robert Hugh Wilson, Blackley, Manchester, England, assignors to Imperial Chemical Industries Limited, a corporation of Great Britain No Drawing. Application October 11, 1949, Serial No. 120,824

14 Claims. (Cl. 252—117)

This invention relates to new materials for the treatment of textiles and, in particular, it relates to new agents which can be used to produce a whitening effect on textile materials and to procedures for the production of these new agents.

This application is a continuation-in-part of co-pending application Serial No. 26,717 of Adams and Wilson, filed May 12, 1948, now abandoned.

Washing or laundering of textile materials tends generally to impart a dull, grayish appearance to the textiles and also to dull the brilliance of colored portions thereof. Numerous expedients have been employed to try to eliminate this dulling or discoloration, e. g., the use of "bluing." These attempts have recently resulted in the development of a series of textile treating agents which are fluorescents, i. e., materials which fluoresce when exposed to light. These types of substances, which are referred to herein as textile whitening agents, can be used to impart an attractive white appearance to textile materials by contacting the textiles with a dilute solution of the whitening agent and then drying the cloth.

All known whitening agents do not possess equal ability to whiten textiles and this present application is concerned with a new group of such agents which have a relatively high, improved ability to impart a whitening effect to textiles, as compared with the related agents known heretofore.

A principal object of the present invention is the provision of textile whitening agents of superior quality. A further object is the provision of such new agents which have the property of imparting such a high degree of whitening effect to textile materials that they may be used in relatively very small amounts to produce a desired degree of whitening. Still further objects will become apparent from the detailed description given hereinafter.

The objects are accomplished according to the present invention by the provision of new textile whitening agents which are represented by the following general formula:

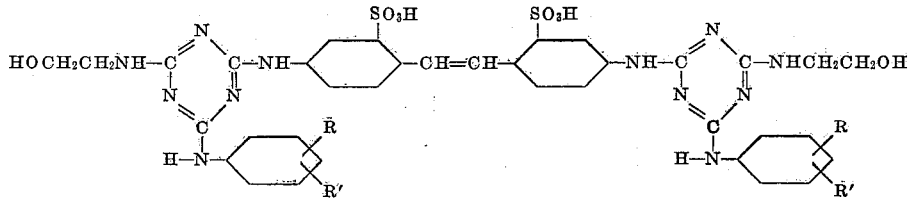

and the salts of the free acids represented by this formula, wherein R equals a hydrogen or methyl radical and R' equals a hydrogen, methyl, hydroxyl, methoxy, acetylamino, or benzoylamino radical.

In order to produce these new compounds one molecular proportion of the 4:4'-diaminostilbene-2:2'-disulphonic acid may be added to water and two molecular proportions of caustic soda added to give a clear solution which is then run into an aqueous suspension of two molecular proportions of cyanuric chloride. The mixture is then stirred and two molecular proportions of caustic soda are gradually added during the reaction. Two molecular proportions of a monocyclic aryl amine are then added and the mixture is stirred at a suitable temperature for a suitable time and caustic soda is added to neutralize the acidity which develops. When no further acidity develops, at least two molecular proportions of monoethanolamine are added and the mixture is heated to complete the reaction. The product may then be salted out in the form of a salt.

Alternatively, the reaction product of the cyanuric chloride and 4:4'-diaminostilbene-2:2'-disulphonic acid may be reacted first with two molecular proportions of monoethanolamine and the product reacted with at least two molecular proportions of the primary amine, or if desired, the cyanuric chloride can be reacted with the monoethanolamine and/or the primary amine before being reacted with the 4:4'-diaminostilbene-2:2'-disulphonic acid.

A more complete understanding of the products of this invention and the method used in their production may be had by reference to the following illustrative examples in which all parts are by weight.

Example I

This example illustrates the production of the disodium salt of 4:4'-bis-(2:4-dichloro-1:3:5-triazyl(6))-diaminostilbene-2:2'-disulphonic acid, which is an intermediate in the production of the final products of this invention.

Eight parts of caustic soda are added to a stirred mixture of 37 parts (0.1 mol) of 4:4'-diaminostilbene-2:2'-disulphonic acid in 240 parts of water. The clear solution so obtained is added to a suspension of cyanuric chloride (obtained by adding a solution of 36.8 parts (0.2 mol) of cyanuric chloride in 92 parts of acetone to 1600 parts of water) at 20–25° C. in 30 minutes. The suspension so obtained is stirred at 20–25° C. for two hours and 80 parts of 10% caustic soda solution is gradually added during this period so that the final mixture is only very slightly acid to Congo Red test paper.

Example II

This example illustrates the preparation of a whitening agent from aniline monoethanolamine and the sulphonic acid product of Example I.

To a suspension of 71.0 parts (0.1 mol) of the disodium salt of 4:4'-bis-(2:4-dichloro-1:3:5-triazyl-(6))-diaminostilbene - 2:2' - disulphonic acid prepared as described in Example I, 18.6 parts (0.2 mol) of aniline are added. The mixture is heated at 50° C. and caustic soda is added from time to time as required to make and maintain the suspension neutral to Delta test paper (paper impregnated with 2:4-dinitrobenzene-azo-1-naphthol-3:6-disulphonic acid). The reaction is complete when no further acidity develops. This takes about one hour. 24.4 parts (0.4 mol) of monoethanolamine are now added, and the mixture is heated at 95-100° C. for five hours. The disodium salt of 4:4'-bis-(2-anilino-4 - ethanolamine - 1:3:5 - triazyl-(6))-diaminostilbene-2:2'-disulphonic acid is precipitated by adding 400 parts of sodium chloride. It is filtered off and dried at 60° C. The product is a pale yellow solid.

Example III

Instead of the 18.6 parts of aniline used in Example II, 21.4 parts of m-toluidine (0.2 mol) are used. The disodium salt of 4:4'-bis-(2-m-toluidino-4-ethanolamino - 1:3:5 - triazyl-(6))-diaminostilbene-2:2'-disulphonic acid produced is a pale yellow powder.

Example IV

Instead of the 18.6 parts of aniline used in Example II, 30.0 parts of p-amino-acetanilide are used. The disodium salt of 4:4'-bis-(2-p-acetyl-aminoanilino-4 - ethanolamino - 1:3:5 - triazyl-(6))-diaminostilbene-2:2'-disulphonic acid produced is a pale yellow powder.

Example V

Instead of the 18.6 parts of aniline used in Example II, 24.2 parts of p-xylidine are used. The disodium salt of 4:4'-bis-(2-p-xylidine-4-ethanolamino - 1:3:5 - triazyl-(6))-diaminostilbene-2:2'-disulphonic acid produced is a pale grey powder.

Example VI

Instead of the 18.6 parts of aniline used in Example II, 27.4 parts of cresidine are used. The disodium salt of 4:4'-bis-(2-cresidino-4-ethanolamino - 1:3:5 - triazyl-(6))-diaminostilbene-2:2'-disulphonic acid produced is a pale yellow powder.

Example VII

Instead of the 18.6 parts of aniline used in Example II, 21.8 parts of m-aminophenol are used. The disodium salt of 4:4'-bis-(2-m-hydroxyanilino - 4 - ethanolamino-1:3:5-triazyl-(6))-diaminostilbene-2:2'-disulphonic acid produced is a dark brown powder.

Example VIII

Instead of the 18.6 parts of aniline used in Example II, 42.4 parts of p-aminobenzanilide are used. The disodium salt of 4:4'-bis-(2-p-benzoylaminoanilino - 4 - ethanolamino - 1:3:5 - triazyl-(6))-diaminostilbene - 2:2' - disulphonic acid produced is a yellow-brown powder.

Example IX

This example illustrates an alternative procedure for producing the whitening agent described in Example II.

To a suspension of 71.0 parts (0.1 mol) of the disodium salt of 4:4'-bis-(2:4-dichloro-1:3:5-triazyl - (6)) - diaminostilbene-2:2'-disulphonic acid prepared as described in Example I, are added 12.2 parts (0.2 mol) of monoethanolamine, and the whole is heated at 50° C. The solution obtained is at first alkaline to Brilliant Yellow test paper, but as the reaction proceeds, this alkalinity disappears. Caustic soda is added as required to maintain alkalinity to Brilliant Yellow paper, and the reaction is considered to be complete when a faint permanent alkalinity is obtained. This takes about one hour. From the solution obtained, the disodium salt of 4:4'-bis-(2-chloro-4-ethanolamino - 1:3:5 - triazyl-(6))-diaminostilbene-2:2'-disulphonic acid is precipitated by addition of 400 parts of sodium chloride.

75.7 parts of this disodium salt (0.1 mol) are stirred with 2000 parts of water and 18.6 parts (0.2 mol) of aniline are added. The mixture is heated at 95-100° C. for five hours, caustic soda being added from time to time as required to make and maintain the solution neutral to Delta test paper. The disodium salt of 4:4'-bis-(2-anilino - 4 - ethanolamino - 1:3:5 - triazyl-(6)) - diaminostilbene-2:2'-disulphonic acid is precipitated by the addition of 400 parts of sodium chloride, filtered off and dried at 60° C. It is a pale yellow solid, identical with that obtained in Example II.

Example X

This example illustrates the production of textile washing compositions incorporating the whitening agents of this invention.

One part of the whitening agent of Example IV is added to 1000 parts of soap powder and the two materials are then thoroughly mixed in a dry powder mixer. A soap powder which is free-flowing and generally the same in appearance as the soap powder prior to the mixing is obtained.

Example XI

This example illustrates the production of another washing composition.

The whitening agent of Example II is incorporated in the crutching process of a soap powder manufacturing operation with a mixture of soap, soda ash and sodium silicate solution. The whitening agent is added in proportion of one part to 1000 parts of the solids content of the soap mixture. Following thorough incorporation of the whitening agent, the mixture is dried in a spray drier. A free-flowing powder of white appearance is obtained which may be used for the laundering of textile materials.

Example XII

This example illustrates the washing of textiles with the washing compositions of this invention.

A wash liquor is prepared containing 0.1-1.0% of soap and 0.00001-0.001% of the whitening agent of Example IV. The amount of wash liquor used is sufficient to give a liquor to goods ratio of between 10:1 and 20:1. The solution is used to wash uncolored materials composed essentially of cotton or linen by immersing the material at 20-100° C. for 60-10 minutes, followed by rinsing in water and drying. Material so treated has a pronounced fluorescence in ultra-violet light and a much whiter and brighter appearance in daylight than material treated under similar conditions with no whitening agent.

In another case, cotton and linen are washed in a wash liquor, in which the disodium salt of bis-(p-acetylaminobenzoyl) - 4:4' - diaminostilbene-2:2'-disulphonic acid), is substituted for the whitening agent of Example IV. The resulting textiles after drying do not possess as white and as bright an appearance as the textiles of the first case.

The above examples show that aniline, m-toluidine, p-xylidine, cresidine, m-aminophenol, and p-aminobenzanilide, p-amino acetanilide, may be used as the aryl amines for the production of the new whitening agents of this invention. These are preferred, but other useable monocyclic aryl amines include 3-methyl-4-aminobenzanilide, 2-methyl - 4 - methoxyanilide and the like.

The new whitening agents of our invention are valuable for the improvement of textile materials of all kinds made from natural and artificial fibres, particularly in view of the high fastness of the whitening effect to repeated washing. The whitening effect can be produced by treating the textile materials with an aqueous solution containing 0.001–0.2% of the new whitening agent.

The new whitening agent can, if desired, be incorporated in soaps and soap products, as indicated by the examples, including filled soaps and soap powders to give detergents suitable for washing textile materials, the whitening effect of the whitening agent being as a general rule promoted by the soap or non-soapy detergent. Examples of suitable soaps are cocoanut oil, fatty acid soaps, stearate soaps, cottonseed oil soaps, rosin soaps and the like. Other detergents, such as trisodium phosphate, sodium silicate, soda ash, or similar inorganic materials may also be included in the washing compositions. The whitening agents are preferably used in proportions of about one part to every 500 to 3000 parts of soap or other detergents, but this may be varied depending upon the detergent so as to provide the concentration of whitening agent in the final wash liquor as indicated above.

We claim:

1. New whitening agents selected from the group consisting of the free acids and salts of the sulphonic acids of the general formula:

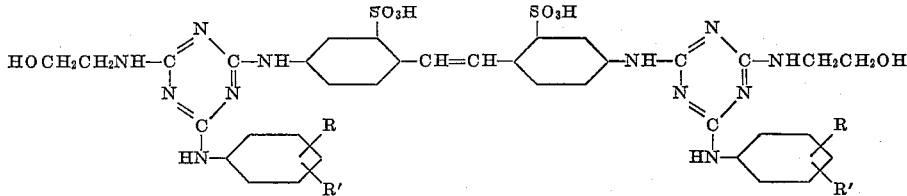

wherein R is a radical from the group consisting of hydrogen and methyl; and R' is a radical from the group consisting of hydrogen, methyl, hydroxyl, methoxy, acetylamino, and benzoylamino.

2. Whitening agents as claimed in claim 1 wherein the agents are alkali metal salts of said sulphonic acids.

3. Whitening agents as claimed in claim 1 wherein R' is the hydrogen radical.

4. Whitening agents as claimed in claim 1 wherein R' is a hydroxy radical.

5. A textile washing composition comprising one part of the sodium salt of a whitening agent as claimed in claim 1 and about 500 to 3000 parts of a detergent selected from the group consisting of stearate soaps, cottonseed oil soaps and rosin soaps.

6. A textile washing composition comprising one part of the sodium salt of a whitening agent, as claimed in claim 1, and about 500 to 3000 parts of an inorganic detergent selected from the group consisting of trisodium phosphate, sodium silicate and soda ash.

7. Whitening agents as claimed in claim 2 wherein R' is a acetylamino radical.

8. Whitening agents as claimed in claim 7 wherein R is the hydrogen radical.

9. The disodium salt of 4:4'-bis-(2-p-acetylaminoanilino - 4 - ethanolamino - 1:3:5-triazyl-(6))-diaminostilbene-2:2'-disulphonic acid.

10. The disodium salt of 4:4'-bis-(2-anilino-4-ethanolamino - 1:3:5 - triazyl-(6))-diaminostilbene-2:2'-disulphonic acid.

11. The disodium salt of 4:4'-bis-(2-m-hydroxyanilino - 4 - ethanolamino - 1:3:5-triazyl-(6))-diaminostilbene-2:2'-disulphonic acid.

12. A washing composition comprising about 500 to 3000 parts of soap selected from the group consisting of stearate soaps, cottonseed oil soaps and rosin soaps and one part of the disodium salt of 4:4' - bis-(2-p-acetylaminoanilino-4-ethanolamino-1:3:5-triazyl-(6))-diaminostilbene - 2:2'-disulphonic acid.

13. A washing composition comprising about 500 to 3000 parts of soap selected from the group consisting of stearate soaps, cottonseed oil soaps and rosin soaps and one part of the disodium salt of 4:4' - bis - (2-anilino-4-ethanolamino-1:3:5-triazyl - (6)) - diaminostilbene-2:2'-disulphonic acid.

14. A washing composition comprising about 500 to 3000 parts of soap selected from the group consisting of stearate soaps, cottonseed oil soaps and rosin soaps and one part of the disodium salt of 4:4' - bis - (2 - m-hydroxyanilino-4-ethanolamino-1:3:5-triazyl-(6))-diaminostilbene - 2:2'-disulphonic acid.

DENNIS ARTHUR WILLIAM ADAMS.
ROBERT HUGH WILSON.

References Cited in the file of this patent

UNITED STATES PATENTS

| Number | Name | Date |
| --- | --- | --- |
| 2,376,743 | Wendt | May 22, 1945 |

FOREIGN PATENTS

| Number | Country | Date |
| --- | --- | --- |
| 731,558 | Germany | Feb. 11, 1943 |
| 624,051 | Great Britain | May 26, 1949 |
| 624,052 | Great Britain | May 26, 1949 |

OTHER REFERENCES

Ser. No. 381,856, A. P. C. Publication, published May 11, 1943.